United States Patent [19]

Akasaka

[11] Patent Number: 5,359,532
[45] Date of Patent: Oct. 25, 1994

[54] FILM THICKNESS CONTROLLER

[75] Inventor: Noriyuki Akasaka, Nagoya, Japan

[73] Assignee: Mitsubishi Jukogyo Kabushiki Kaisha, Tokyo, Japan

[21] Appl. No.: 972,132

[22] Filed: Nov. 5, 1992

[30] Foreign Application Priority Data

Nov. 12, 1991 [JP] Japan .................................. 3-295978

[51] Int. Cl.⁵ ............................................ G06F 15/46
[52] U.S. Cl. .................................. 364/476; 264/40.1; 364/177; 425/141
[58] Field of Search ............... 364/473, 476, 177, 176, 364/183; 425/141, 142, 143, 144, 145, 135, 140; 264/40.1

[56] References Cited

U.S. PATENT DOCUMENTS 5,038,397 8/1991 Akasaka .......................... 364/473 X
5,104,593 4/1992 Joseph ............................ 364/473 X Primary Examiner—Joseph Ruggiero
Attorney, Agent, or Firm—McAulay Fisher Nissen Goldberg & Kiel

[57] ABSTRACT

A film thickness controller capable of obtaining the rapidity of predetermined thickness control always even if the operation conditions are changed is disclosed.

The film thickness controller includes a die having a mechanism for adjusting and operating a discharge amount along the width direction of film, a thickness gauge for detecting variation of thickness of the film moved with a lag time from a position of the die to a position of the thickness gauge, and adapters 200, 201, 202 and 203 added to an operational calculator 103, a state prediction device 106, a state shifter 105 and an operation amount commander 108 constituting the film thickness controller, respectively, to thereby automatically modify a matrix of a control operation equation to be coincident with the operation conditions with respect to variation of the lag time due to movement of the film and automatically modify a gain matrix of the operational calculator, a gain matrix of a regulator and a matrix in the control operation equation to be coincident with the operation condition with respect to variation of film thickness sensitivity to heater input variation by change of the operation conditions.

2 Claims, 10 Drawing Sheets

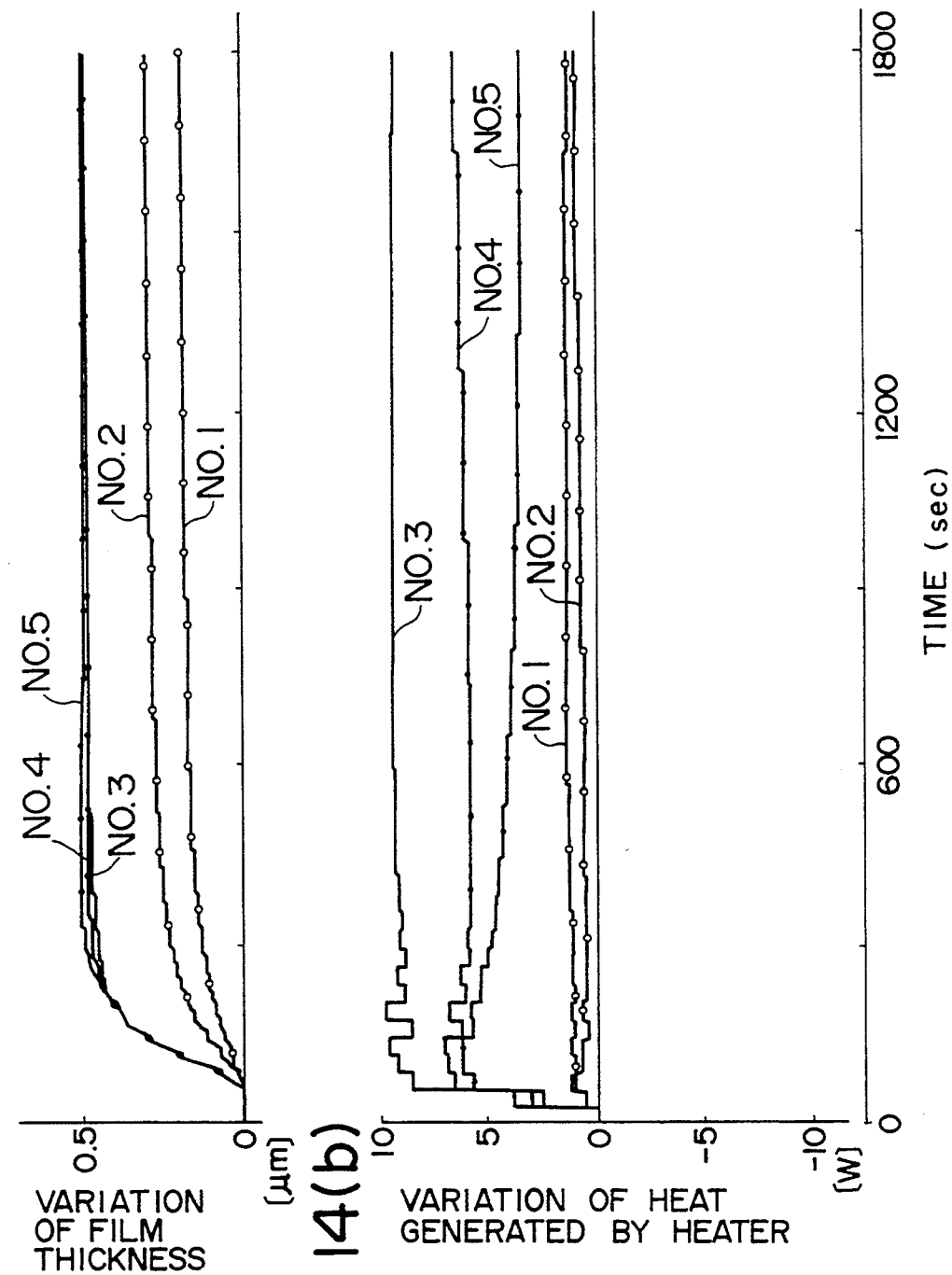
FIG. 14(a) VARIATION OF FILM THICKNESS
FIG. 14(b) VARIATION OF HEAT GENERATED BY HEATER

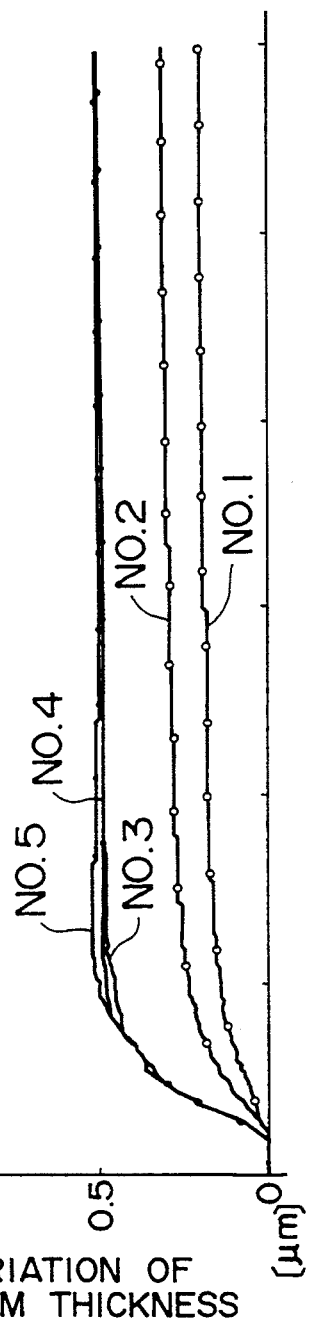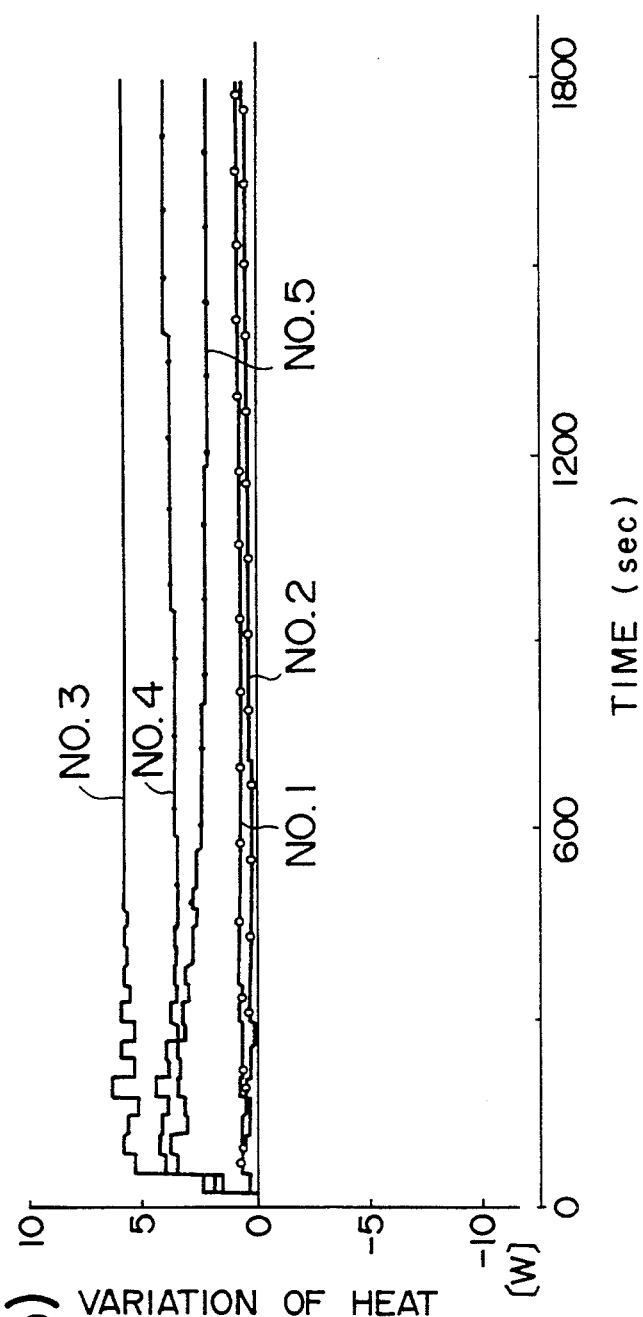
F I G. 15(a) VARIATION OF FILM THICKNESS
F I G. 15(b) VARIATION OF HEAT GENERATED BY HEATER

FILM THICKNESS CONTROLLER

FIELD OF THE INVENTION AND RELATED ART STATEMENT

FIELD OF THE INVENTION

The present invention relates to a film thickness controller for use in an extrusion molding apparatus or a flowing type molding apparatus such as a film manufacturing apparatus.

GENERAL METHOD OF FILM FABRICATION

Conventional thickness control of resin film is described with reference to FIG. 2. FIG. 2 schematically illustrates a general process of manufacturing film. An extruder 1a is used to melt resin particles by a screw and liquefy them. The molten resin is pushed out from a narrow gap 3a of a warm die 2a. The gap 3a is kept to be the same width perpendicular to paper of FIG. 2 and accordingly liquefied resin 4a in the form of thin plate flows down from the die 2a.

The plate-like liquefied resin 4a comes into contact with a cooled rotating roller 5a to be hardened so that film 6a having a thickness is formed. The film 6a is extended by a longitudinal extender 13 and a lateral extender 14 after the rotating roller 5a in order to obtain a profile having a predetermined thickness. The longitudinal extender 13 increases a speed of movement of the film 6a along the flowing direction of the film to thereby extend the film 6a in the flowing direction and thin the thickness of the film. The lateral extender 14 broadens the width of the film 6a without change of the film speed to thereby thin the thickness of the film. The film 6a from the lateral extender 14 is wound on a winder 9a.

FILM THICKNESS INHOMOGENEITY

The film 6a is required to have the same predetermined thickness in the width direction. However, since it is difficult to cause the liquefied resin to pass through the narrow gap 3a of the die 2a in the width direction at the same speed, the thickness of the film 6a is not necessarily the same in the width direction.

MEASUREMENT OF FILM THICKNESS

A thickness gauge 10 measures a thickness of the film 6a. A radiation by natural collapse of radioactive substance is utilized to measure a thickness of the film 6a in accordance with an attenuation factor of the radiation when the radiation passes through the film 6a. A single detector included in the thickness gauge 10 is moved in the reciprocating manner in the width direction of the film 6a to thereby measure a thickness of the film in the width direction.

CONVENTIONAL METHOD OF HOMOGENIZATION OF FILM THICKNESS

In order to make the thickness of the film to be the same predetermined value in the width direction, as shown in FIGS. 2 and 3, a number of heaters 12a are distributed and embedded in both sides of the gap 3a of the die 2a in the width direction of the film to uniform a flow of the liquefied resin at the gap 3a in the width direction of the film.

When generated heat of the heater 12a at a portion of the film 6a having the thickness which is too thick is reduced, a temperature of the resin being in contact with the die 2a is reduced to increase a viscosity resistance of the resin, so that the speed of the resin at that portion is reduced. Accordingly, the thickness of the film 6a at the portion where the generated heat of the film is reduced is thinned so that the portion of the film 6a having the thickness which is too thick is corrected. On the contrary, when the thickness of the film 6a at a portion of the film is too thin, generated heat of the heater 12a at that portion is increased. Consequently, the speed of the resin at that portion is increased and the thickness of the film 6a at that portion is increased.

The above principle can be used to automatically control the thickness of the film 6a by the heater 12a. FIG. 4 is a block diagram schematically illustrating a principle of the thickness control. A difference between a thickness of film measured by a thickness measuring instrument or a thickness gauge 10 and a set value of thickness is supplied to a controller 13. The controller issues a command for heat to be generated of the heater 12a to vary generated heat from the heater 12a. When the generated heat from the heat is varied, a speed of resin in the die 2a can be changed and a thickness of film at a portion where the generated heat of the heater is varied can be changed to thereby control the thickness of the film at the portion.

PROBLEMS OF CONVENTIONAL METHOD

The conventional film thickness controller has technical problems (1), (2) and (3) as described hereinafter.

(1) LAG TIME BEFORE MEASUREMENT

There is a lag time L1 due to a movement of the film between an outlet of the die and the thickness gauge 10 until a variation in the thickness of the film is detected by the thickness gauge 10 after the variation occurs at the outlet of the die.

(2) INTERFERENCE

When an operation end of a certain portion of a die lip adjustment mechanism is operated, there occurs an interference phenomenon that a thickness of the film corresponding to a portion adjacent thereto is also varied.

(3) A command of an operation amount for a number of operation ends must be changed simultaneously in order to minimize interference effect to the film thickness due to the interference of the operation end of the lip adjustment mechanism described above item (2).

LAG TIME AFTER MEASUREMENT:

When a thickness gauge utilizing radiation is used, the thickness gauge 10 is moved in the reciprocating manner in the width direction of the film and when the thickness gauge reaches an end of the film, measurement of all of thickness data along the width direction is completed and control operation is started. In this case, time is required until the thickness gauge 10 reaches the end of the film after the thickness gauge 10 has measured a thickness at a certain portion of the film. This time is a lag time L2 until the control operation is actually stated after the thickness data has been obtained.

TOTAL LAG TIME

When an operation amount of the operation end is varied, its influence is detected as a thickness data, and a lag time until the control operation is made using the thickness data is a sum of the lag time L1 described in (1) and the above lag time L2. FIG. 5(a) is a block diagram schematically illustrating a thickness control system similar to the block diagram of FIG. 4 except that the lag times L1 and L2 are considered. FIG. 5(b) is a block diagram in which the lag times are combined into one block equivalently. A conventional feedback control system does not have such lag time, while the thickness control system has the large lag time (L1+L2) as shown in FIG. 5(b).

As a means for solving the above technical subject, the film thickness controller as shown in FIG. 6 has been filed by the same applicant as this patent application.

PRIOR ART

This film thickness controller comprises a die having a mechanism which adjusts and operates a discharge amount of molten resin along the width direction of the film, a thickness gauge 10 for detecting variation of thickness of the film after the lapse of a lag time L1 corresponding to a time required for movement of the film between the die and the thickness gauge, a subtracter 101 for producing a difference between a thickness value of the film measured by the thickness gauge 10 and a set value of thickness at its measured position, an integrator 102 for time-integrating the difference of thickness produced by the subtracter 101, a memory 104 for storing past time sequence data of operation amounts of an operation end during a time L=L1+L2 equal to a sum of the lag time L1 and a time L2 until the thickness gauge reaches an end of the film from the measured position, an operational calculator 103 which uses the past time operation amounts stored in the memory 104 to produce an estimated value of state variable at a time earlier than a time when the thickness gauge 10 reaches the end of the film by the lag time L, a state shifter 105 supplied with an output of the integrator 102 and an output of the operational calculator for producing a state estimated value at a time shifted by an average /L which is an average value of the lag times L corresponding to thickness control points in the whole width of the film, a state prediction device 106 supplied with the past time sequence data of operation amounts of the operation end stored in the memory 104 for producing a state variation amount by an input from a time after the lapse of the average lag time /L to a time when the thickness gauge reaches the end of the film, an adder 107 for adding an output of the state shifter and an output of the state prediction device to produce a state estimated value at a time when the thickness gauge 10 reaches the end of the film approximately, and an operation amount commander for multiplying a state estimated value produced from the adder 107 by a state feedback gain to produce an operation amount command value of the operation end. Output of the thickness gauge 10 is supplied through a sampler 100 to the subtracter 101 and the operational calculator 103.

This apparatus is described in detail in the above-mentioned patent specification, while the gist thereof is now described below.

In this film thickness controller, the operational calculator estimates the state occurring earlier by the lag time and corrects a phase delay component due to the lag time by means of the time integration by the state shifter and the state prediction device.

Operation of the above film thickness controller is now described.

TRANSFER FUNCTIONS FROM HEAT TO THICKNESS

Description is made to a case where measured values of thicknesses 1' to 5' of the film at positions of the thickness gauges 10 corresponding to positions of five heaters 1 to 5 as shown in FIG. 7 are used to control the thickness 3' to a predetermined value. The reason why the heaters 1, 2, 4 and 5 disposed adjacent to the heater 3 are considered in addition to the heater 3 in order to control the thickness 3' is that a control system is designed in consideration of interference of the heaters 1, 2, 4 and 5 to the thickness 3'. Other heaters disposed outside of the heaters 1 and 5 are neglected since influence thereof to the thickness 3' is small. It is assumed that, at time t, generated heats of the heaters 1 to 5 are $u_1(t)$, $u_2(t)$, $u_3(t)$, $u_4(t)$ and $u_5(t)$, respectively, and film thicknesses of the thicknesses 1' to 5' are $y_1(t)$, $y_2(t)$, $y_3(t)$, $y_4(t)$ and $y_5(t)$, respectively.

When Laplace transformed versions of $u_i(t)$ and $y_i(t)$ are $U_i(s)$ and $Y_i(s)$, respectively, $U_i(s)$ and $Y_i(s)$ are related by the following transfer function matrix G(s):

$$\begin{bmatrix} Y_1(s) \\ Y_2(s) \\ Y_3(s) \\ Y_4(s) \\ Y_5(s) \end{bmatrix} = \underbrace{\begin{bmatrix} g_1(s) & g_2(s) & g_3(s) & 0 & 0 \\ g_2(s) & g_1(s) & g_2(s) & g_3(s) & 0 \\ g_3(s) & g_2(s) & g_1(s) & g_2(s) & g_3(s) \\ 0 & g_3(s) & g_2(s) & g_1(s) & g_2(s) \\ 0 & 0 & g_3(s) & g_2(s) & g_1(s) \end{bmatrix}}_{G(s)} \begin{bmatrix} U_1(s) \\ U_2(s) \\ U_3(s) \\ U_4(s) \\ U_5(s) \end{bmatrix} \quad (1)$$

In the above equation, $G_1(s)$ is a transfer function producing time variation of the thickness 3' when only the heater 3, for example, is varied. $G_2(s)$ is a transfer function producing time variation of the thickness 3' when only the heater 2 or 4 is varied. $G_3(s)$ is a transfer function producing time variation of the thickness 3' when only the heater 1 or 5 is varied. The equation (1) does not include the lag time due to a film movement delay from the outlet of the die to the thickness gauge 10 and accordingly $G_1(s)$, $G_2(s)$ and $G_3(s)$ are expressed by a rational function of the Laplace operator. Further, non-diagonal items of the transfer function matrix G(s) of equation (2) represent interference to thickness by adjacent heaters.

STATE EQUATION

State equations used generally in the control system design is employed to express the relation between the input $U_i(s)$ and the output $Y_i(s)$ (i=1 to 5) of the equation (1).

$$x'(t) = Ax(t) + Bu(t) \quad (2)$$

$$y(t) = Cx(t) \quad (3)$$

where
 x(t) is a state vector,
 x'(t) is a time differentiation of the state vector,
 u(t) is an input vector, that is,
 $u(t) = [u_1(t), u_2(t), u_3(t), u_4(t) \text{ and } u_5(t)]^T$ (T represents transpose of a matrix)
 y(t) is an output vector, that is,
 $y(t) = [y_1(t), y_2(t), y_3(t), y_4(t) \text{ and } y_5(t)]^T$ It is premised that the equations (2) and (3) are controllable and observable.

More particularly, there exists $u(\tau)$ ($0 \leq \tau \leq$) having x(t)=0 at any time (t>0) starting from any initial state x(0). Simultaneously, the output y(t) is observed during $0 \leq \tau \leq t$, so that the initial state x(0) can be obtained.

SOLUTION OF STATE EQUATION

It is publicly known that x(t) given by the equation (2') is a solution of the equation (2) and accordingly this is used in the description without demonstration.

$$x(t) = e^{At}x(0) + \int_0^t e^{A(t-\tau)}Bu(\tau)d\tau \tag{2'}$$

OUTPUT EQUATION IN PRESENCE OF LAG TIME

When the lag time by movement of the film from the outlet of the die to the thickness gauge 10 is L1 and time required for movement of the thickness gauge 10 from the thickness measuring point 3' to the end of the film is L2, the total lag time L on the side of the output vector y as shown in FIG. 5(b) is given by $$L = L1 + L2 \tag{4}$$

Accordingly, the output equation (3) is expressed as follows:

$$y(t) = Cx(t-L) \tag{5}$$

A relation of the input u(t) (generated heat of the heater) and the output y(t) (detected value of the thickness gauge) is shown as in FIG. 8 on the basis of the equations (2) and (5).

More particularly, the output equation (3) is used to obtain the output Yp from the solution x(t) of the state equation (2) and the Laplace transform of the output Yp is multiplied by the transfer function $e^{-SL}$ corresponding to the lag time. This result is subjected to the Laplace transformation so that the output y(t) is obtained.

EFFECT OF ZIGZAG PATH OF MEASUREMENT

The thickness gauge 10 measures thickness of the film while being moved in the reciprocating manner in the width direction of the film. Since the film is moved at a certain speed, the thickness gauge 10 measures the thickness of the film along a locus as shown in FIG. 9. Thus, the control operation is made at points A and B. When the control operation is made at the end point A of the film and a measurement point of the thickness 3' is indicated by a point C of FIG. 9, the lag time L2 due to the movement of the thickness gauge 10 is expressed by a movement time L2' between the points C and A of FIG. 9.

On the other hand, when the control operation is made at the end point B of the film, the lag time L2 due to the movement of the thickness gauge 10 is expressed by a movement time L2'' between points C' and B of FIG. 9. It is apparent from FIG. 9 that distances of L2' and L2'' are generally different and accordingly the lag time L represented by the transfer function $e^{-SL}$ of FIG. 8 is different depending on the control operation for the thickness 3' made at the end point A and the control operation made at the end point B of the film. In order to identify whether the control operation is made at the end point A or B, the thickness gauge 10 uses an arrival end identification signal d representing whether the thickness gauge reaches either of both ends of the film.

x(t), y(t) ... etc. are all vectors. However, in order to make description more concretely below, the third components x3(t) and y3(t) are described as a typical example.

SUBTRACTER

A difference between a detected value y3(t) and a set value r3(t) of the thickness 3' is calculated by the subtracter.

$$\epsilon(t) = r3(t) - y3(t)$$

ps In the following description, it is assumed that $r_3(t) = 0$. Accordingly, $\epsilon(t) = -y_3(t)$ is effected.

INTEGRATOR

In order to avoid influence of external disturbance due to heat conductance from the adjacent heater when the thickness 3' is controlled to the set value, an integrator is introduced for $\epsilon(t)$.

The integrator must integrate the difference $\epsilon(t)$ from a time for the last control operation to a time t for the current control operation. However, actually, the integration can not be made until time (t−L) due to the lag time L. An output $/x_I(t)$ of the integrator corresponding to $u_3(t)$ is expressed by $$\begin{aligned}
/x_I(t) &= \int_0^t \epsilon(\tau)d\tau \\
&= \int_0^{t-L} \epsilon(\tau)d\tau + \int_{t-L}^t \epsilon(\tau)d\tau \\
&= -\int_0^{t-L} y_3(\tau)d\tau - \int_{t-L}^t y_3(\tau)d\tau \\
&= -\int_0^{t-L} C_3 x(\tau)d\tau - \int_{t-L}^t C_3 x(\tau)d\tau
\end{aligned} \tag{6}$$

$C_3$ represents the third row of the matrix C of the equation (3). The first term of the right side of the equation (6) is a time integration of an amount obtainable from the thickness gauge actually until time t and accordingly it can be calculated from the measured value. However, an amount to be integrated of the second term of the right side can not be obtained from the thickness gauge and the time integration can be calculated as it is. Accordingly, in order to obtain $/x_I(t)$, the following expanded system including $/x_I(t)$ as the state variable is considered.

EXPANDED SYSTEM

When the equation (6) is time-differentiated as x(0)=0, the following equation is obtained.

$$\begin{aligned}
/x'_I(t) &= -C_3 x(t-L) - C_3 x(t) + C_3 x(t-L) \\
&= -C_3 x(t)
\end{aligned} \tag{7}$$

When the equations (2) and (7) are combined, the following expression is obtained.

$$\begin{bmatrix} /x'_I(t) \\ x'(t) \end{bmatrix} = \begin{bmatrix} 0 & -C_3 \\ 0 & A \end{bmatrix} \begin{bmatrix} /x_I(t) \\ x(t) \end{bmatrix} + \begin{bmatrix} 0 \\ B \end{bmatrix} u(t) \qquad (8)$$

The state vector of the expanded system is defined as $/x_I(t) = [/x_I(t).x(t)]^T$.

By using $/x(t)$, the equation (8) is expressed as follows:

$$/x'(t) = /A/x(t) + /Bu(t) \qquad (9)$$

where $/A$ and $/B$ are matrix and vector as represented by $$/A = \begin{bmatrix} 0 & -C_3 \\ 0 & A \end{bmatrix} \quad /B = \begin{bmatrix} 0 \\ B \end{bmatrix} \qquad (10)$$

FEEDBACK GAIN MATRIX

When it is assumed that the input $u(t)$ is given by $$\begin{aligned} u(t) &= -/F/x(t) = -[f_1, F_2] \begin{bmatrix} /x_I(t) \\ x(t) \end{bmatrix} \\ &= -f_1/x_I(t) - F_2 x(t) \end{aligned} \qquad (11)$$

$f_1$ represents the first column of the matrix $/F$. Further, if $/x_I(t)$ and $x(t)$ is obtained and the feedback gain matrix $/F$ is defined so that all peculiar values of the matrix $(/A-/B/F)$ is within a stable area, the thickness $y_3(t)$ can be controlled to a predetermined value stably by means of the input $u(t)$. Since the matrices $/A$ and $/B$ does not include influence of the lag time $L$, the feedback gain matrix $/F$ can be decided such as a system having no lag time $L$, and rapidity and steady accuracy of the control system can be ensured.

Therefore, it is necessary to obtain $/x_I(t)$ and $x(t)$.

ESTIMATION OF $/x_I(t)$ and $x(t)$

A measure for actually obtaining $/x_I(t)$ and $x(t)$ of the equation (11) is now described. $/x_I(t)$ and $x(t)$ are obtained by initializing time $(t-L)$ and integrating the equation (9) from time $(t-L)$ to time $t$. Since the input $u(t)$ is already known, the state amounts $/x_I(t)$ and $x(t)$ can be obtained by performing the integration retroactively to the past by the lag time $L$.

As a magnitude of the lag time at this time, an average value $/L$ of the lag time $L$ at the thickness control points of the whole width of the film is employed at first. The average lag time $/L$ is equal to the whole lag time $L$ at the center thickness control point of the film. The state amounts $/x_I(t)$ and $x(t)$ at time that the control operation is made this time are obtained by the following equation by using the equation (2') with $/x_I(t-L)$ and $x(t-L)$ as the initial state.

$$\begin{aligned} \begin{bmatrix} /x_I(t) \\ x(t) \end{bmatrix} &= e^{/A\{t-(t-/L)\}} \begin{bmatrix} /x_I(t-L) \\ x(t-L) \end{bmatrix} + \\ &\quad \int_{t-/L}^{t} e^{/A(t-\tau)}/Bu(\tau)d\tau \\ &= e^{/A/L} \begin{bmatrix} /x_I(t-L) \\ x(t-L) \end{bmatrix} + \int_{t-/L}^{t} e^{/A(t-\tau)}/Bu(\tau)d\tau \end{aligned} \qquad (12)$$

ESTIMATION OF $/x_I(t-L)$

The first term $/x_I(t-L)$ of the right side of the equation (12) is expressed by the following equation by integrating the equation (7).

$$/x_I(t-L) = \int_0^{t-L} C_3 x(\tau) d\tau \qquad (13)$$

Since the right side of the equation (13) is a calculable amount and is equal to an integrated value of control difference of the output $y_3(t)$ until time $t$ for this time control operation, the equation (13) is expressed as follows:

$$/x_I(t-L) = x_I(t) \qquad (14)$$

where $x_I(t)$ is an integrated value of the control difference of the detected value $y_3(t)$ of the thickness 3' until time t.

ESTIMATION OF $x(t-L)$

The first term $x(t-L)$ of the right side of the equation (12) can be calculated as follows:

From the equations (2) and (5), $$x'(t-L) = Ax(t-L) + Bu(t-L) \qquad (15)$$

$$y(t) = Cx(t-L) \qquad (16)$$

A variable $\omega(t)$ defined by the following equation is introduced.

$$\omega(t) = x(t-L) \qquad (17)$$

The following equations are formed from the equations (15) to (17).

$$\omega'(t) = A\omega(t) + Bu(t-L) \qquad (18)$$

$$y(t) = C\omega(t) \qquad (19)$$

Accordingly, an operational calculator for the equations (18) and (19) can be designed to obtain the estimated value $x(t-L) = \omega(t)$ in the first term of the equation (12) from the detected signal $y(t)$ of the thickness. The design method of the operational calculator is described below.

EFFECT OF THE MOVING DIRECTION OF THE SENSOR

The control operation is made each time the thickness gauge 10 reaches the points A and B as shown in FIG. 9 or at intervals of a predetermined period of time T.

The time is a time required for the thickness gauge 10 to be moved across the film width. On the other hand, the lag time L for the point C of the thickness 3' is different depending on the points A and B. That is, Lag time $L_A$ for control operation at point A
$= LI + L2'$ Lag time $L_B$ for control operation at point B
$= LI + L2''$ (20)

It is apparent that $L_A > L_B$ for the point C. The average lag time $/L$ can be expressed by $/L = 1/2(L_A + L_B)$.

FIG. 10 schematically illustrates calculation of the estimated value $\hat{x}(t_{K+1} - L_A)$ in the control operation at the point A. The generated heat u(K) of the heater is maintained constant between the control operation time $t_K$ and $tK+1$.

Since the thickness gauge reaches the point A at time $t_{K+1}$, the thickness gauge has reached the point B at the past time $t_K$ earlier than the time $t_{K+1}$ by time T. It is assumed that the estimated value $\hat{\omega}(t_K) = \hat{x}(t_K - L_B)$ is obtained in the control operation at the point B performed at time $t_K$. In the control operation at the point A to be performed at time $t_{K+1}$, the already-known $\hat{\omega}(t_K)$ is used to obtain the estimated value $\hat{\omega}(t_{K+1}) = \hat{x}(t_{K+1} - L_A)$.

It is assumed that time $t_1$ is earlier than time $t_{K+1}$ by the lag time $L_A$ and time $t_0$ is earlier than time $t_K$ by the lag time $L_B$. Time $t_1$ is early by several periods of the control period T in accordance with a magnitude of the lag time $L_A$. Here, it is generally assumed that time $t_1$ is within a section $(t_{Ki}, t_{Ki+1})$.

FIG. 11 schematically illustrates calculation of the estimated value $\hat{x}(t_{K+1} - L_B)$ in the control operation at the point B.

As apparent from FIGS. 10 and 11, the time interval T of the control operation are fixed, while since the lag times $L_A$ and $L_B$ at the points A and B are different, a difference of time corresponding to the estimated values $\hat{\omega}(t_K)$ and $\hat{\omega}(t_{K+1})$ is different from the time interval T.

ESTIMATION OF $\hat{\omega}(t_{K+1})$ at A

The estimated value $\hat{\omega}(t_{K+1})$ is obtained from the equations (18) and (19) as follows. First of all, the control operation at the point A shown in FIG. 10 is considered. The known estimated value $\hat{\omega}(t_K) = \hat{x}(t_K - L_B)$ is expressed by $\hat{x}(t_0)$. The estimated value $\hat{\omega}(t_{K+1}) = \hat{x}(t_{K+1} - L_A)$ to be obtained is expressed by $\hat{x}(t_1)$. The predicted value $\tilde{x}(t_1)$ of the state variable at time $t_1$ can be calculated on the basis of the known $\hat{x}(t_0)$ and input after time $t_0$ from the equation (18) as follows.

$$\tilde{x}(t_1) = e^{A(t1-t0)}\hat{x}(t_0) + \int_{t_0}^{t_1} e^{A(t1-\tau)} Bu(\tau) d\tau \quad (21)$$

In the above equation, $t_0 = t_K - L_B$, $t_1 = t_{K+1} - L_A$, $t_1 - t_0 = T - L_A + L_B$, and $T = t_{K+1} - t_K$.

When a new variable $\eta = t_1 - \tau$ is introduced, the following equation is obtained.

$$\tilde{x}(t_1) = e^{A(t1-t0)}\hat{x}(t_0) + \int_0^{t_1-t_0} e^{A\eta} Bu(t_1 - \eta) d\eta \quad (22)$$

The integration of the right side of the equation (22) represents integration of the dual line portion of FIG. 10. If $\tilde{x}(t_1) = \tilde{\omega}(t_{K+1})$ and $\hat{x}(t_0) = \tilde{\omega}(t_K)$, the equation (22) is expressed by the following equation.

$$\tilde{\omega}(t_{K+1}) = e^{A(t1-t0)}\hat{\omega}(t_K) + \int_0^{t_1-t_0} e^{A\eta} Bu(t_1 - \eta) d\eta \quad (23)$$

The control operation at the point B shown in FIG. 11 is now considered. At this time, in the equation (22), $t_0 = t_K - L_B$, $t_1 = t_{K+1} - L_B$, and $t_1 - t_0 = T - L_B + L_A$. By integrating the dual portion of FIG. 11, the same equation as the equation (22) is obtained.

$$\tilde{x}(t_1) = e^{A(t1-t0)}\hat{x}(t_0) + \int_0^{t_1-t_0} e^{A\eta} Bu(t_1 - \eta) d\eta \quad (24)$$

If $\tilde{x}(t_1) = \tilde{\omega}(t_{K+1})$ and $\hat{x}(t_0) = \tilde{\omega}(t_K)$, the predicted value $\tilde{\omega}(t_{K+1})$ is given by the same following equation as the equation (23) from the equation (24).

$$\tilde{\omega}(t_{K+1}) = e^{A(t1-t0)}\hat{\omega}(t_K) + \int_0^{t_1-t_0} e^{A\eta} Bu(t_1 - \eta) d\eta \quad (25)$$

OBSERVER

Accordingly, by designing the operational calculator for the equations (19), (23) and (25), the estimated value $\hat{\omega}(t_{K+1})$ at $t = t_{K+1}$ is obtained as follows.

$$\tilde{\omega}(t_{K+1}) = e^{A(t1-t0)}\tilde{\omega}(t_K) + \int_0^{t_1-t_0} e^{A\eta} Bu(t_1 - \eta) d\eta \quad (26)$$

$$\hat{\omega}(t_{K+1}) = \tilde{\omega}(t_{K+1}) + K[y(t_{K+1}) - C\tilde{\omega}(t_{K+1})] \quad (27)$$

$$t_1 - t_0 = T - L_A + L_B \quad (28)$$

where K is a matrix for gain of the operational calculator.

ESTIMATION OF $\hat{\omega}(t_{K+1})$ at B

Equation of $\hat{\omega}(t_{K+1})$ $$\tilde{\omega}(t_{K+1}) = e^{A(t1-t0)}\hat{\omega}(t_K) + \int_0^{t_1-t_0} e^{A\eta} Bu(t_1 - \eta) d\eta \quad (29)$$

$$\hat{\omega}(t_{K+1}) = \tilde{\omega}(t_{K+1}) + K[y(t_{K+1}) - C\tilde{\omega}(t_{K+1})] \quad (30)$$

$$t_1 - t_0 = T - L_B + L_A \quad (31)$$

Thus, calculation of the first term of the right side of the equation (12) is possible.

CALCULATION OF THE SECOND TERM OF EQUATION (12)

Final operation is to obtain the integration term of the right side of the equation (12):

$$I = \int_{t-/L}^{t} e^{/A(t-\tau)}/Bu(\tau)d\tau$$

The integration is to calculate a variation amount of state $$\begin{bmatrix} /x_I(t) \\ x(t) \end{bmatrix}$$

by input $u(\tau)$ from time $(t-/L)$ to $t$.

The integration I integrates the dual line portion of FIG. 12. FIG. 12 shows the case where $/L$ satisfies $T < /L \leq 2T$.

$$I = \int_{t_{K+1}-/L}^{t_{K+1}-/L+T-m} e^{/A(T_{K+1}-\tau)}/Bd\tau u(K-1) +$$

$$\int_{t_{K+1}-/L+T-m}^{t_{K+1}} e^{/A(T_{K+1}-\tau)}/Bd\tau u(K)$$

$$m = 2T - /L$$

When new variable $\eta = t_{K+1} - \tau$ is introduced and the above equation is arranged, the integration I is expressed by the following equation.

$$I = e^{/AT} \int_{0}^{/L-T} e^{/A\sigma}/Bd\sigma u(K-1) + \int_{0}^{T} e^{/A\sigma}/Bd\sigma u(K) \quad (32)$$

where $u(K_i)$ is a value of $u(t)$ at $(t_{Ki}, t_{Ki}+1)$.

APPARATUS FOR THIS METHOD

When the calculation procedure of the conventional control system described above is arranged it is as follows.

(1) Thickness Gauge: The vector $y(K+1)$ composed of the detected values of film thickness $y_1(K+1)$, $Y_2(K+1)$, $y_3(K+1)$, $y_4(K+1)$ and $y_5(K+1)$ is obtained at the control operation execution time $t = t_{K+1}$ of the control period T by the thickness gauge shown in FIG. 6. Sampler: The sampler 100 is closed every control operation execution time $t = t_{K+1}$ and is closed each time the thickness gauge 10 reaches the point A or B of the film side end. When the thickness gauge 10 reaches the point A or B of the film end of FIG. 9, the thickness gauge 10 produces the arrival end identification signal d representing whether the thickness gauge reaches either of both ends of the film.

(2) Subtracter: The film thickness detected value $y(K+1)$ is supplied to the subtracter 101 of FIG. 6 and the subtracter 101 produces a thickness difference $\epsilon(K+1) = r_3(K+1) - y_3(K+1)$ of set thickness value $r_3(K+1)$ and $y_3(K+1)$, for example.

(3) Integrator: The integrator 102 produces a time-integrated value of the thickness difference on the basis of the thickness difference $\epsilon(K+1)$ supplied from the subtracter 101.

$$/x_I(K+1) = /x_I(K) + 0.5(t_{K+1} - t_K)\{\epsilon(K) + \epsilon(K+1)\} \quad (33)$$

where $\epsilon(K)$ is a thickness difference upon thickness detection at the last time (time $t = t_K$) and $/x_I$ is an output of the integrator 102 at time $t = t_K$.

The integrator 102 compensates external heat for varying the thickness $y_3$ by the generated heat from the heater and serves as an external compensator so that the thickness $y_3$ is always coincident with the set value.

(4) Operational Calculator: When the thickness gauge 10 reaches one of the film side ends, the thickness gauge produces the arrival end identification signal d and calculates $$\hat{\omega}(K+1)$$

from the equation (26), (27) or (29) in accordance with the identification signal d. $\omega(K+1)$ is a value of $\omega(t)$ at $(t_{K+1}, t_{K+2})$. The past time sequence of generated heat from the heater $(u(K-2)$ and $u(K-1))$ and the detected value of film thickness $y(K+1)$ stored in the memory 104 are inputted and produces the estimated value of the state variable $\hat{x}(t_{K+1}-L) = \hat{\omega}(K+1)$ at time $(t_{K+1}-L)$ earlier than time $t_{K+1}$ by the lag time L defined by the arrival end identification signal d produced by the thickness gauge.

(5) State Shifter: In calculation of the first term of the right side of the equation (12), the state estimated value $[x_I(t_{K+1}), \hat{\omega}(t_{K+1})]^T$ at time $(t_{K+1}-L)$ is multiplied by a coefficient $e^{/A/L}$ for shifting the state by the average lag time $/L$ to obtain the state estimated value $e^{/A/L}[x_I(K+1), \hat{\omega}(K+1)]^T$ at time $t_{K+1}$. That is, output $/x_I(K+1)$ of the integrator 102 and output $\hat{\omega}(K+1)$ of the operational calculator 103 are supplied to the state shifter 105 and the state shifter 105 multiplies the outputs by the coefficient for shifting the state by the average lag time $/L$ to obtain the state estimated value at time $t_{K+1}$. A magnitude of the lag time $/L$ is an average value of the lag time at the thickness control points of the whole width of the film. The state shift by input $u(K)$ applied at time area of only the average lag time $/L$ is represented by the integration term of the second term of the right side of the equation (12) and the correction is made by the state prediction device 106 to be described below.

(6) State Prediction Device: The second term of the right side of the equation (12) represents a state estimated value by the time sequence $u(K-1)$, $u(K)$ of input applied to the time area of the average lag time $/L$ from time $(t_{K+1}-/L)$ to time $t_{K+1}$ and is represented by I of the equation (32), for example. That is, the past time sequence of the generated heat from the heater (here, two of $u(K-1)$, $u(K)$) determined by the average lag time $/L$ stored in the memory 104 is supplied to the state prediction device 106 and the state variation mount I by input $u(K)$ from time $(t_{K+1}-/L)$ to time $t_{K+1}$ is produced.

(7) Adder: The adder 107 adds output $e^{/A/L}[x_I(K+1), \hat{\omega}(K+1)]^T$ of the state shifter 105 and output of the state prediction device 106 and produces the state estimated value $[/\hat{x}_I(K+1), \hat{x}(K+1)]^T$ at time $t_{K+1}$.

As described above, only the state estimated value at time $(t_{K+1}-L)$ is obtained by the operational calculator due to the lag time L, while the state shifter 105 and the state prediction device 106 can make integration operation by the average lag time /L to obtain the state estimated value at time $t_{K+1}$ approximately. Influence of the phase delay due to the lag time L can be removed by this operation.

(8) OPERATION AMOUNT COMMANDER: Generated heat u(K+1) by the heater from time $_{K+1}$ to the next control operation time $t_{K+1}$ is defined by the following equation using state feedback gain ($f_1$, $f_2$).

$$u(K+1) = -f^1/\hat{x}_I(K+1) - F_2\hat{x}(K+1) \qquad (34)$$

More particularly, the adder 107 supplies the approximate state estimated value $[/\hat{x}(K+1), \hat{x}(K+1)]^T$ at time $t_{K+1}$ to the heat commander 108 and the heat commander 108 multiplies the state estimated value $[/\hat{x}(K+1), \hat{x}(K+1)]^T$ by the state feedback gain to thereby define the heat command value.

(9) The same control operation is performed when the next film thickness detected value y(K+2) to the sampler 100 at the control operation execution time $t = t_{K+2}$ that the thickness gauge 10 is moved in the width direction of the film after the control period T and reaches the opposite end of the film.

LACK OF FLEXIBILITY

In the film manufacturing apparatus, in order to obtain film having a predetermined thickness profile, factors for deciding operation conditions are varied as follows.

(1) Casting speed determined by a peripheral speed of a rotation roller 5a, (2) Discharge amount of the extruder determining a resin discharge speed from the die 2a, and (3) Longitudinal and lateral extension magnification of the film.

In this manner, when the operation conditions are varied, the conventional film thickness controller has the following problems.

(1) When the casting speed and the longitudinal and lateral extension magnification are varied, the lag time $L_1$ by movement of the film from the outlet of the die to the thickness gauge 10 is varied. Accordingly, the lag times $L_A$ and $L_B$ are varied and further the average lag time /L is also varied. Thus, as shown in FIGS. 10 and 11, since the integration start section in the control operation equations (26) and (29) is varied depending on magnitude of the lag time $L_A$ and $L_B$, it is necessary to have the adaptability so that the control operation equations (26) and (29) are executed coincidently with the operation conditions. Further, it is necessary to have the adaptability capable of being calculated using the lag time /L coincident with the operation conditions in the control operation equation (12).

(2) The film thickness sensibility for variation of heater input is varied by change of the operation conditions. Even if the operation conditions are varied, it is necessary to have the adaptability capable of varying the matrices /A and /B of the equation (12), the regulator gain matrix /F of the equation (11) and the gain matrix K of the operational calculator of the equation (27) and (30) to values coincident with the operation conditions in order to maintain the predetermined control performance.

OBJECT AND SUMMARY OF THE INVENTION

It is an object of the present invention to provide a film thickness controller which can always obtain the rapidity in predetermined thickness control even if operation conditions are varied.

It is another object of the present invention to provide an apparatus capable of controlling film thickness in accordance with variation of the casting speed and lateral extension magnification.

It is still another object of the present invention to provide an apparatus capable of controlling film thickness in accordance with variation of operation conditions.

According to the present invention, in a film molding apparatus including a die having a mechanism for adjusting and operating a discharge amount of molten resin along the width of film and a thickness gauge for detecting thickness of the film moving with a lag time $L_1$ from a position of the die to a position of the thickness gauge while moving in the direction perpendicular to a moving direction of the film in the reciprocating manner, respective adapters are added to an operational calculator, a state prediction device, a state shifter and an operation amount commander constituting the film thickness controller so that a matrix of a control operation equation is automatically modified to a value coincident with operation conditions with respect to variation of a lag time due to movement of the film and the matrix of the control operation equation, a gain matrix of a regulator and a gain of the operational calculator to values coincident with the operation conditions with respect to variation of film thickness sensitivity for input variation of a heater due to variation of the operation conditions.

A difference between a thickness value detected by the thickness gauge and a set thickness value at a position of the detection is calculated by a subtracter. The thickness difference is time-integrated by an integrator. An operation amount time sequence of the operation amount commander past by a time equal to a sum L of the lag time $L_1$ and a time $L_2$ until the thickness gauge reaches the end of the film starting from the measurement position is stored in a memory. The stored information of the memory is supplied to the operational calculator, and an estimated value of state variable earlier than a time that the thickness gauge reaches the film side end and all thickness detected values of film are inputted by the lag time L in accordance with the film side end which the thickness gauge has reached. The adapter for the operational calculator modifies the matrix used in the operation equation in the operational calculator to be coincident with the operation conditions.

The state shifter multiplies a coefficient for shifting the state by the average lag time /L which is an average value of the lag time L at both film side ends from outputs of the integrator and the operational calculator and produces the state estimated value at time when the thickness gauge reaches the film side end. The adapter of the shifter modifies the matrix used in the operation equation in the state shifter to be coincident with the operation conditions. The state prediction device produces an state variation amount by setting of input from time when the thickness gauge has reached the film side end to time past the average lag time /L on the basis of the past operation amount time sequence of an operation end stored in the memory. The adapter for the state prediction device modifies the matrix used in the operation equation in the state prediction device to be coincident with the operation conditions.

Outputs of the state shifter and the state prediction device are added by the adder to obtain a state estimated value at time that the thickness gauge reaches the film side end. This state estimated value is supplied to the operation amount commander and is multiplied by a state feedback gain to be produced as operation amount command value of the operation end. The adapter for the operation amount commander modifies the matrix used in the operation equation in the operation amount commander to be coincident with the operation conditions.

As described above, the matrix of the control operation equation is automatically modified to a value coincident with the operation conditions with respect to variation of the lag time by movement of the film due to variation of the operation conditions and the matrix in the control operation equation, the gain matrix of the regulator and the gain matrix of the operational calculator are automatically modified to a value coincident with the operation conditions with respect to variation of film thickness sensitivity to the variation of heater input due to variation of the operation conditions, so that the predetermined rapidity of thickness control can be always obtained even if the operation conditions are varied.

BRIEF DESCRIPTION OF THE DRAWINGS

FIG. 14a is a graph explaining simulation result in a control apparatus of the present invention, namely variation of film thickness versus time;

FIG. 14b is a graph explaining simulation result in a control apparatus of the present invention, namely variation of heat generated by the heater versus time;

FIG. 15a is a graph explaining other simulation results in a control apparatus of the present invention, namely variation of film thickness versus time; and FIG. 15b is a diagram explaining other simulation results in control apparatus of the present invention, namely variation of the heat generated by the heater versus time.

PREFERRED EMBODIMENT OF THE INVENTION

An embodiment of the present invention is now described with reference to the accompanying drawings.

BLOCK DIAGRAM

Figure 1:
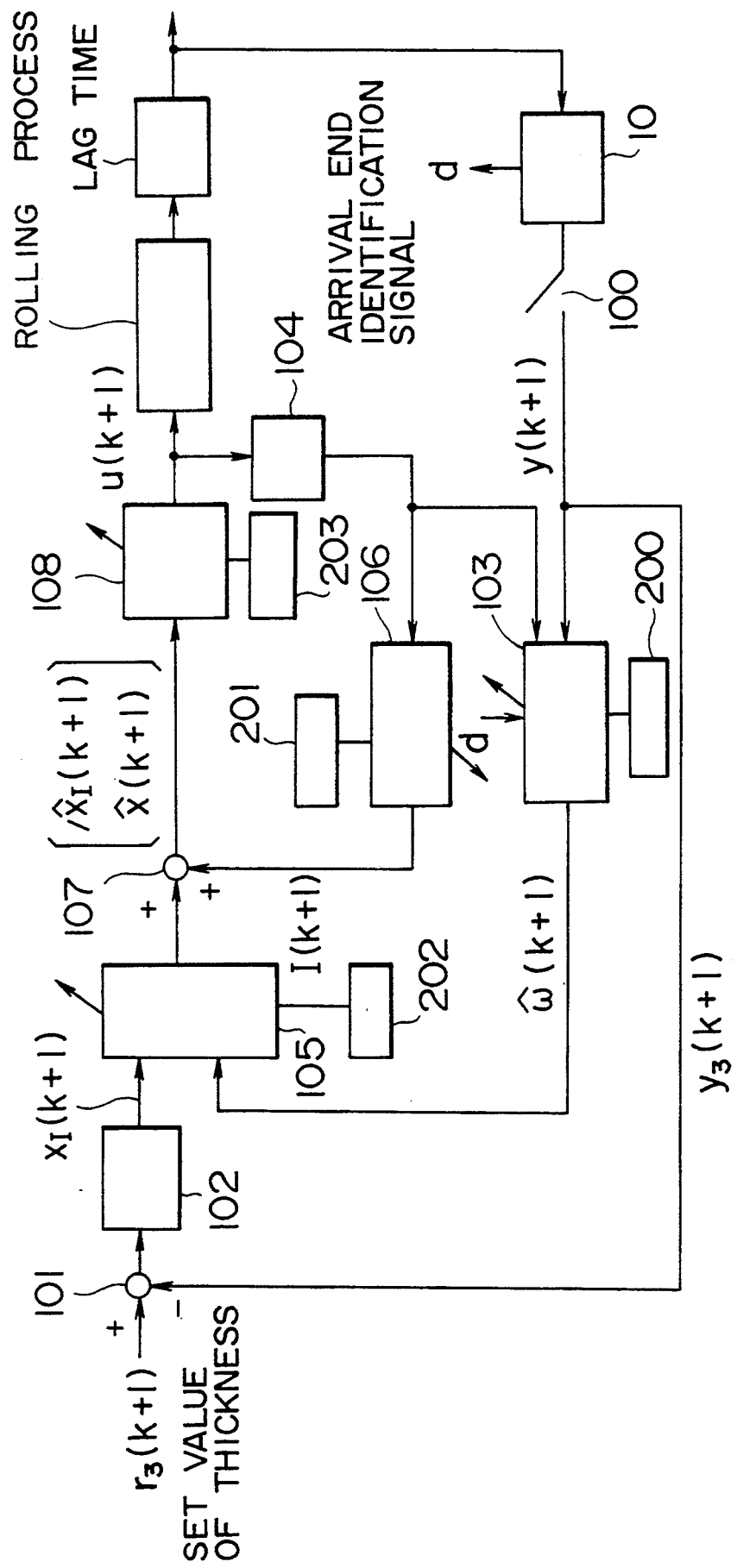
FIG. 1 is a block diagram schematically illustrating a configuration of a film thickness controller according to an embodiment of the present invention.
Figure 2:
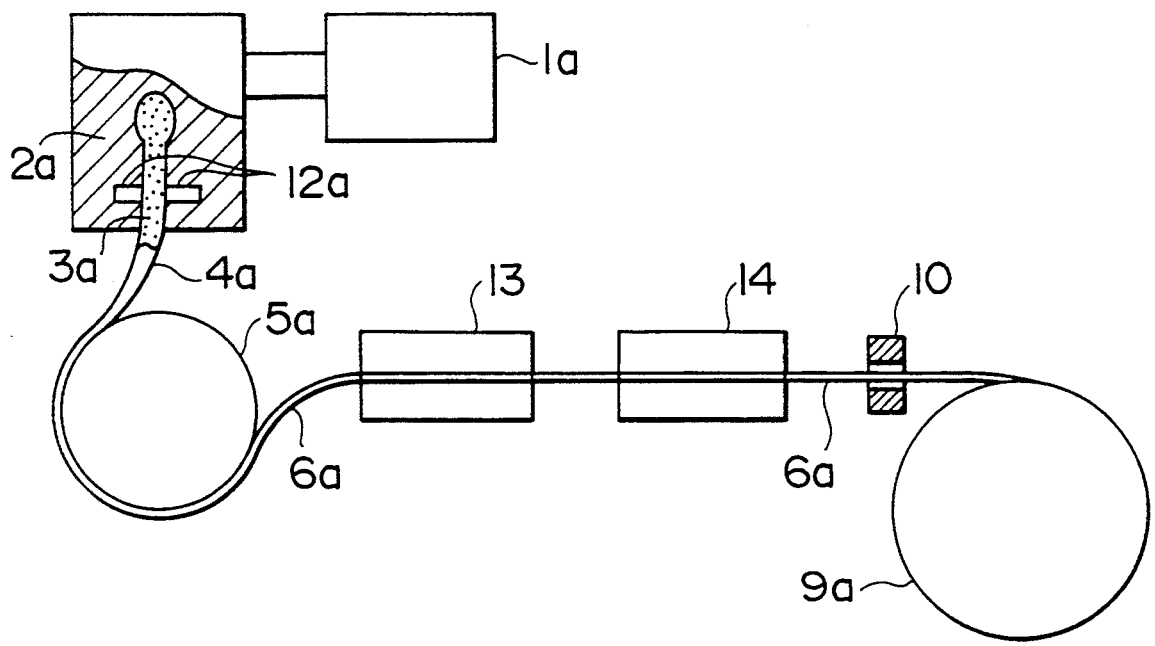
FIG. 2 schematically illustrating a conventional film manufacturing plant.
Figure 3:
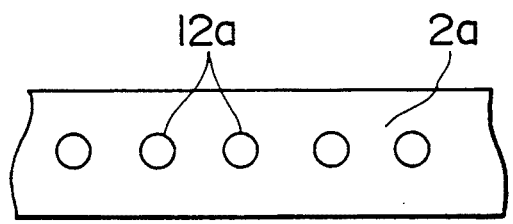
FIG. 3 is a plan view showing heaters embedded in a die.
Figure 4:
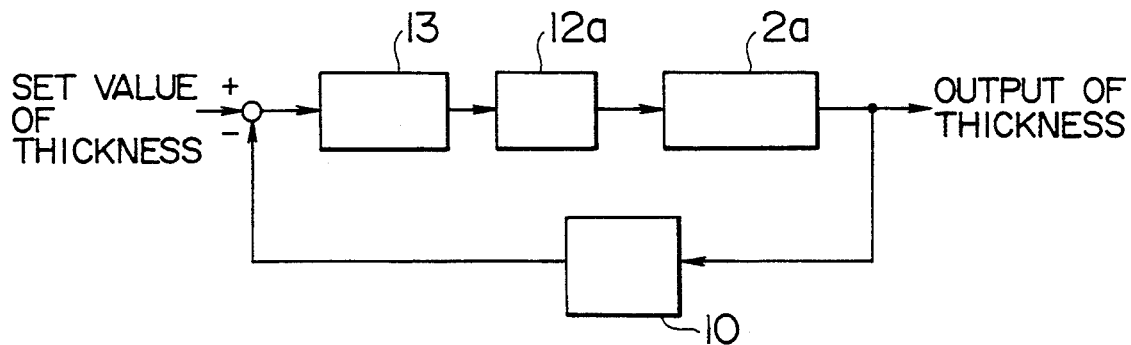
FIG. 4 is a control block diagram schematically illustrating a conventional film thickness controller.
Figure 5A:
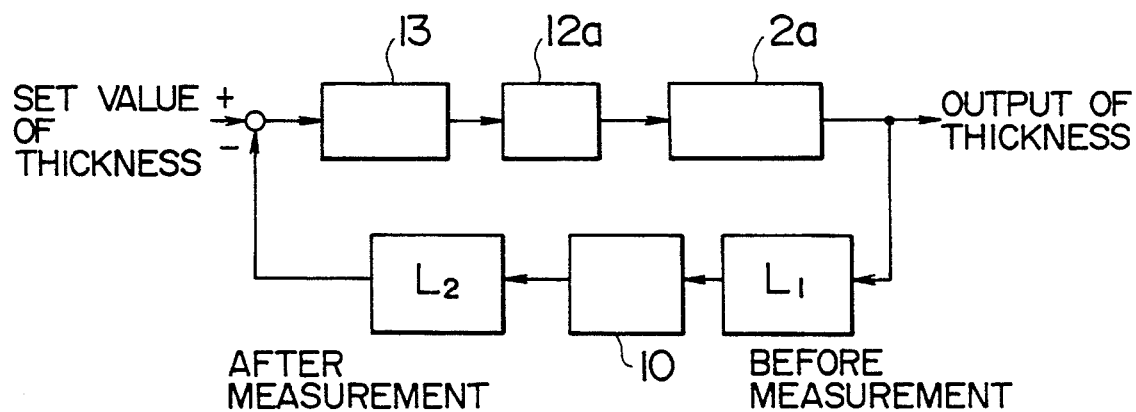
FIG. 5a is a block diagram schematically illustrating a conventional film thickness controller including a lag time.
Figure 5B:
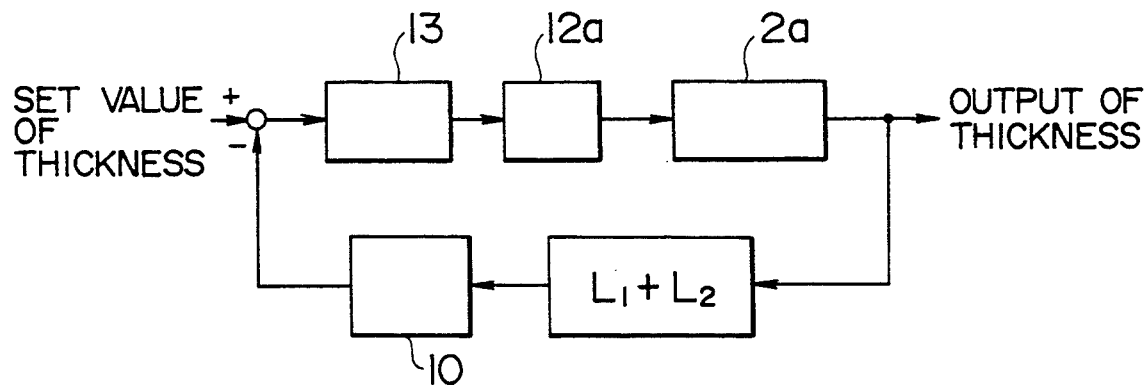
FIG. 5b is a block diagram schematically illustrating a convention film thickness controller including a lag time.
Figure 6:
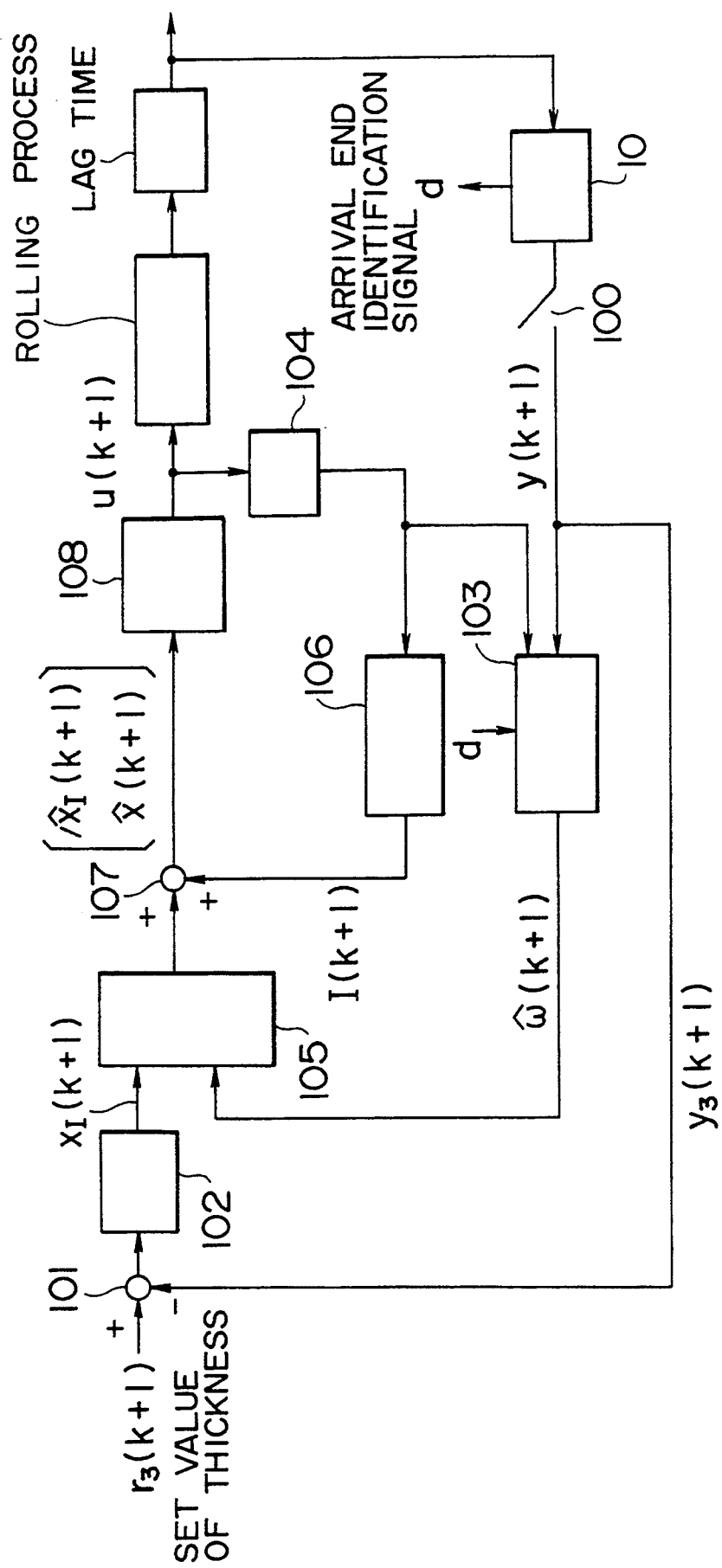
FIG. 6 is a block diagram schematically illustrating a configuration of a conventional film thickness controller.

FIG. 1 is a block diagram schematically illustrating a configuration of a film thickness controller according to an embodiment of the present invention. The film thickness controller according to the present invention comprises an operational calculator adapter 200, a state prediction device adapter 201, a state shifter adapter 202 and an operation amount commander adapter 203 added to the operational calculator 103, the state prediction device 106, the state shifter 105 and the operation amount commander 108, respectively, in the film thickness controller shown in FIG. 6. Other configuration is the same as that of the apparatus of FIG. 6. Accordingly, like elements are designated by like reference numeral and detailed description thereof is omitted.

Operation of the embodiment is now described.

TRANSFER FUNCTION

Figure 7:
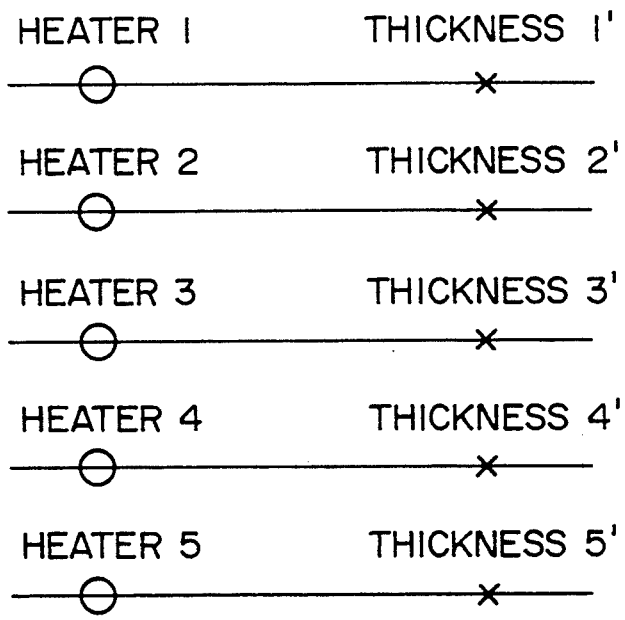
FIG. 7 schematically illustrates five heaters corresponding to five thickness detection positions.
Figure 8:
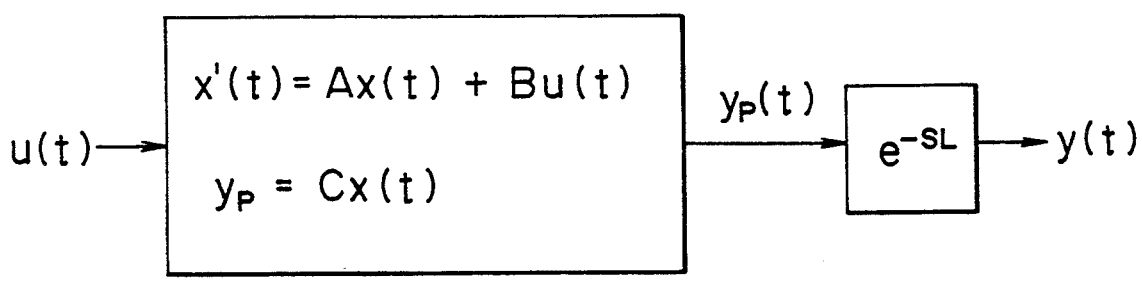
FIG. 8 is a block diagram representing a dynamic mathematical model of film thickness.
Figure 9:
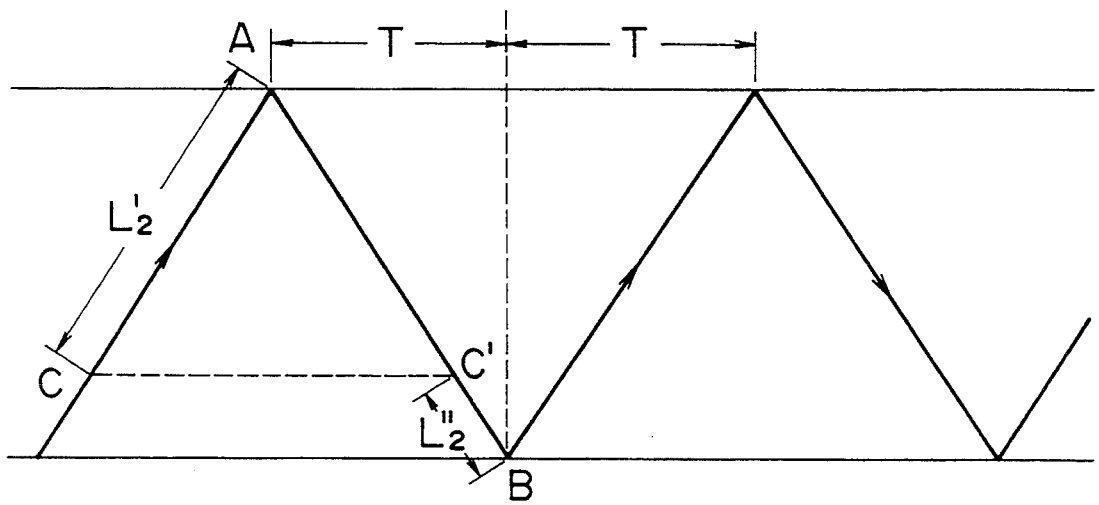
FIG. 9 schematically illustrates a locus of a thickness gauge for detecting film thickness.

In the system including five heaters as shown in FIG. 7, for example, when it is assumed that thickness 3' is controlled to a predetermined value, the dynamic characteristic of the system is represented on the basis of the equation (1) as follows.

$$Y(s) = G(s)U(s) \tag{35}$$

$$Y(s) = \begin{bmatrix} Y_1(s) \\ \cdot \\ \cdot \\ Y_5(s) \end{bmatrix} \quad U(s) = \begin{bmatrix} U_1(s) \\ \cdot \\ \cdot \\ U_5(s) \end{bmatrix} \tag{36}$$

GAIN DEPENDING ON THE CONDITIONS

The dynamic characteristic of an object to be controlled when factors for deciding operation conditions are varied diversely is expressed basically by the following equation.

When a transfer function matrix in some basic operation conditions which is a reference model is $G_0(s)$, $$Y(s) = kG_0(s)U(s) \tag{37}$$

where k is a proportional gain constant. In the reference operation conditions, k=1.

Description is now made to variation of the proportional gain constant k when the operation conditions are varied.

(1) When the casting speed is varied:

Variation of the gain constant corresponding to variation in the casting speed is represented by k1. The variation k1 is defined by the following equation.

$$k1 = vc0/vc \tag{38}$$

where vcO: casting speed in the reference operation condition, and vc: casting speed when the operation conditions are varied.

The equation (38) represents that the film thickness becomes thinner as the casting speed vc is increased.

(2) When the discharge amount of the extruder is varied:

Variation of the gain constant corresponding to variation of the discharge amount of the extruder is expressed by k2. The variation k2 is defined by the following equation.

$$k2 = W/WO \qquad (39)$$

where
- WO: discharge amount of the extruder in the reference operation conditions, and
- W: discharge amount of the extruder when the operation conditions are varied.

The equation (39) represents that the film thickness becomes thicker as the discharge amount of the extruder is increased.

(3) When the longitudinal and lateral extension magnifications are varied:

Variation of the gain constant corresponding to variation of the extension magnification is expressed by k3. The variation k3 is defined by the following equation.

$$k3 = (ELDO/ELD) \times (ELTD/ELT) \qquad (40)$$

where
- ELDO: longitudinal extension magnification in the reference operation conditions,
- ELTD: lateral extension magnification in the reference operation conditions,
- ELD: longitudinal extension magnification when the operation conditions are varied, and
- ELT: lateral extension magnification when the operation conditions are varied.

The equation (40) represents that the film thickness becomes thicker as the extension magnification is increased.

From the foregoing, when the various operation conditions are varied, the gain constant is given collectively by the following equation.

$$k = k1\,k2\,k3 \qquad (41)$$

MATRICES AND THE CONDITIONS

Variation of the matrices (A, B, C) used in the control operation equation is now described when the operation conditions are varied.

The matrices (A, B, C) are the representation of the state equation given as a minimum realization system of transfer matrix kGO(s) in certain operation conditions. Matrices of the state equation giving the minimum realization system of GO(s) are (AO, BO, CO). At this time, when the operation conditions are varied, the matrices (A, B, C) of the minimum realization system of the transfer function matrix kGO(s) are given by the following equation.

$$A = AO,\ B = BO,\ C = CO \qquad (42)$$

Accordingly, the matrices A and B are the same matrices AO and BO in the reference operation conditions even if the operation conditions are changed. The matrix C is obtained by multiplying the matrix CO by the gain constant k defined by the equation (41). The matrix /A used in the control operation equation (12) includes a part of the matrix C as described in the equation (10) and accordingly the matrix /A is changed when the operation conditions are changed.

LAG TIMES AND THE CONDITIONS

Description is now made to variation of the lag time when the operation conditions are changed. When a distance from the heater 12a to the longitudinal extender 13 is 11 and a distance from the longitudinal extender 13 to the thickness gauge 10 is 12, the lag time L1 due to movement of the film from the outlet of the die 2a to the thickness gauge 10 is expressed by the following equation.

$$L1 = 11/vc + 12/(vc \times ELD) \qquad (43)$$

The lag time L2 due to movement of the thickness gauge in the width direction of the film is not changed even if the operation conditions are changed, while the whole lag time $L = L1 + L2$ in the thickness control is changed by the operation conditions.

Means and operation for maintaining the control performance even if the lag time and the matrices in the control operation equations are changed when the operation conditions described above are changed.

Figure 10:
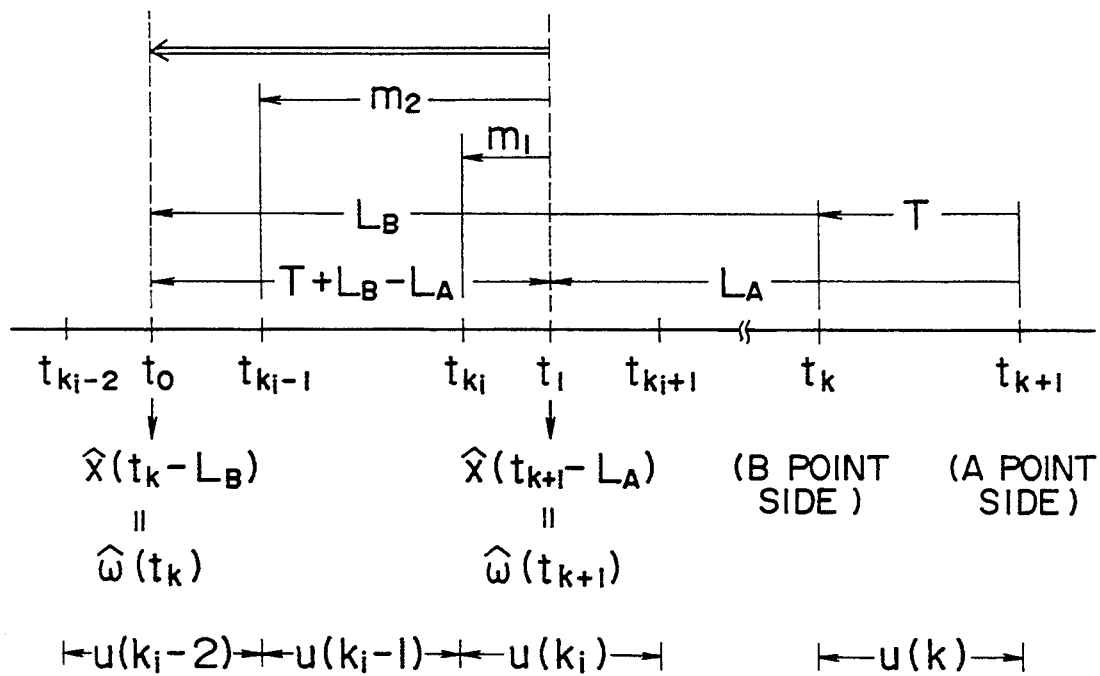
FIG. 10 is a diagram illustrating time intervals and time-integration section of control operation.
Figure 11:
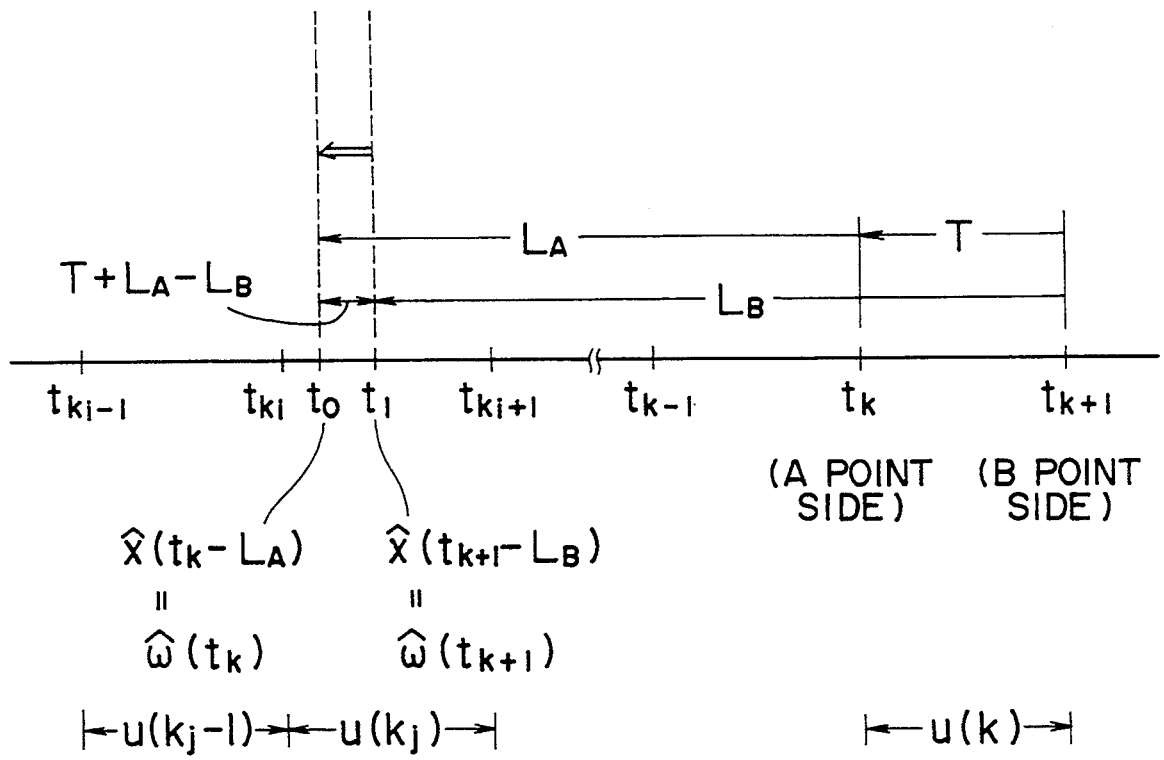
FIG. 11 is a diagram illustrating time-integration section.
Figure 12:
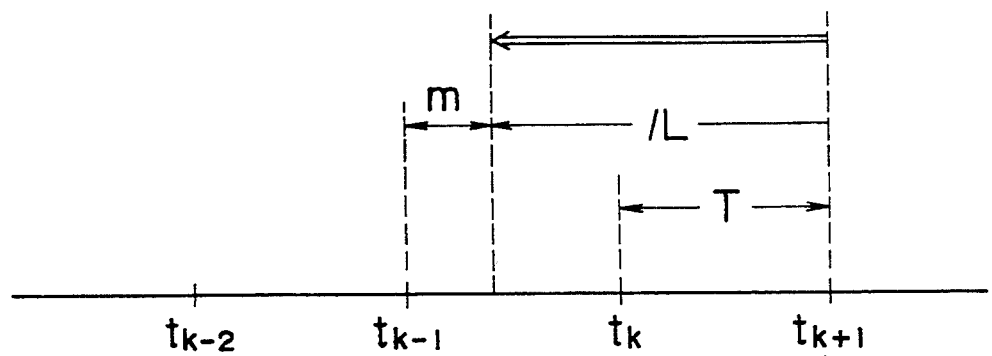
FIG. 12 is a diagram illustrating time-integration section.

OPERATIONAL CALCULATOR ADAPTER (1) Means for the control operation equation in the operational calculator 103:

As shown in FIG. 10 or 11 in the equation (26) or (29) for obtaining the prediction value in the operational calculator 103, the integration start time $t_1$ is assumed to be within the time section $(t_{Ki}, t_{Ki+1})$. Time $t_1$ is earlier than the current time $t_{K+1}$ by the lag time $L_A$ or $L_B$ and accordingly time $t_1$ is changed depending on the operation conditions. The integration time $(t_1 - t_0 = T - L_A + L_B)$ or $(T - L_A + L_B)$ is not changed in magnitude for the same position of the control point even if the operation conditions are changed since a component of the lag time L1 is canceled but has a different value for each position of the control point. Accordingly, division is made to the following cases, for example, in accordance with magnitude of the integration time $t_1 - t_0$) different for each control point.

(a) When the section $(t_1 - t_0)$ is within the section $(t_{Ki}, t_{Ki+1})$:

$$\tilde{\omega}(t_{K+1}) = e^{A(t_1-t_0)}\hat{\omega}(t_K) + \int_0^{t_1 - t_0} e^{A\eta}\,Bd\,\eta\,u(K_i) \qquad (44)$$

(b) When the section $(t_1 - t_0)$ is within the section $(t_{K-1}, t_{Ki+1})$:

$$\tilde{\omega}(t_{K+1}) = e^{A(t_1-t_0)}\hat{\omega}(t_K) + \int_0^{m_1} e^{A\eta}\,Bd\,\eta\,u(K_i) + \int_{m_1}^{t_1 - t_0} e^{A\eta}\,Bd\,\eta\,u(K_i - 1) \qquad (45)$$

$$m_1 = t_1 - t_{Ki}$$

c) When the section $(t_1 - t_0)$ is within the section $(t_{K-2}, t_{Ki+1})$:

$$\bar{\omega}(t_{K+1}) = e^{A(t_1-t_0)}\bar{\omega}(t_K) + \int_0^{m_1} e^{A\eta} Bd\,\eta\, u(K_i) + \quad (46)$$

$$\int_{m_1}^{m_2} e^{A\eta} Bd\,\eta\, u(K_i - 1) +$$

$$\int_{m_2}^{t_1 - t_0} e^{A\eta} Bd\,\eta\, u(K_i - 2)$$

$$m_1 = t_1 - t_{Ki} \quad m_2 = t_1 - t_{Ki-1}$$

where
u(K): input vector in time section ($t_{Ki}$, $t_{Ki+1}$),
$m_1$: length of time in section ($t_{Ki}$, $t_{Ki+1}$) of the integration section ($L_1 - L_0$), and
$m_2$: length of time in section ($t_{Ki-1}$, $t_{Ki+1}$) of the integration section ($L_1 - L_0$).

A procedure for performing the operation of the equations (44)-(46) is now described in accordance with the operation conditions.

(i) When the operation conditions are determined, the whole lag time L is obtained for each control point so that time or section ($t_{Ki}$, $t_{Ki+1}$) in which the integration start time $t_1$ is positioned is determined for each control point.

Further, magnitudes m1 and m2 of the integration section of the equations (45) and (46) are determined. The integration section ($t_1 - t_0$) is different for each control point but is not changed even if the operation conditions are changed.

(ii) When it is assumed that a time necessary for movement of the thickness gauge between the heaters is ΔT (not changed depending on the operation conditions), the integration section ($t_1 - t_0$) is given by the integral multiple of ΔT. The magnitudes m1 and m2 are continuous values but are approximated by the integral multiple of ΔT.

(iii) The matrix exp(A(N ΔT)) is calculated by time of 2T at intervals of ΔT $$\int_0^{N\Delta T} e^{A\eta} Bd\,\eta \quad [N = 1, 2, \ldots, 2T/\Delta T]$$

The matrices A and B are not changed even if the operation conditions are changed as described in the equation (42) and accordingly may be calculated once previously.

(iv) Matrices corresponding to exp(A($t_1 - t_0$)) are selected from the matrix exp(A(N ΔT) (N=1, 2, ...) for each control point.

(v) Matrix

A matrix which approximates the following equation satisfactorily is selected.

$$\int_0^{m_1} e^{A\eta} Bd\,\eta, \quad \int_0^{m_2} e^{A\eta} Bd\,\eta$$

From the foregoing, variation of the operation conditions is treated by selecting a matrix corresponding to the following matrices:

$$e^{A(t_1-t_0)}$$

$$\int_0^{t_1 - t_0} e^{A\eta} Bd\,\eta,$$

$$\int_0^{m_1} e^{A\eta} Bd\,\eta,$$

$$\int_0^{m_2} e^{A\eta} Bd\,\eta$$

The matrices are required to calculate the prediction values for each control point from the following matrix previously calculated by using the matrices A and B in the reference operation conditions.

$$e^{A(N\Delta T)}, \quad \int_0^{N\Delta T} e^{A\eta} Bd\,\eta \quad [N = 1, 2, \ldots, 2T/\Delta T]$$

The convergence of the operational calculator 103 is required not to be changed even if the operation conditions are changed. Accordingly, description is made to a line of thinking the gain matrix K of the operational calculator in the equations (27) and (30) when the operation conditions are changed.

A peculiar value of the operational calculator 103 is given by a peculiar value of the following matrix.

$$[e^{A(t_1-t_0)} - KCe^{A(t_1-t_0)}]$$

The gain matrix of the operational calculator in the reference operation conditions is K0, and it is understood that the peculiar value of the above matrix is the same as that in the reference operation conditions if the gain matrix K obtained by multiplying the gain matrix K0 by 1/k is used when only the matrix C becomes k times in some operation conditions. Accordingly, in order that the convergence of the operational calculator is not changed even if the operational conditions are changed, the whole of the gain matrix K0 of the operational calculator is required to be multiplied by 1/k.

As described above, modification operation of the matrix necessary in the prediction value calculation equations (26) and (29) in accordance with the operation conditions and modification operation of the gain matrix K of the operational calculator of the equation (27) and (30) are made by the operational calculator adapter 200 shown in FIG. 1.

STATE PREDICTION DEVICE ADAPTER (2) Means for the control operation equation in the state prediction device 106

In the integration calculation I of the second term of the right side of the equation (12), division is made to the following cases, for example, in accordance with the magnitude of the average lag time /L.

(a) In case of $0 < /L \leq T$ $$I = \int_0^{/L} e^{/A\eta} /Bd\,\eta\, u(K) \quad (47)$$

(b) In case of $T < /L \leq 2T$ $$I = e^{/AT} \int_0^{/L - T} e^{/A\eta} /Bd\,\eta\, u(K - 1) + \quad (48)$$

-continued $$\int_0^T e^{A\eta} /Bd\, \eta\, u(K)$$

(c) In case of $2T </L \leq 3T$ $$I = e^{A(2T)} \int_0^{/L - 2T} e^{A\eta} /Bd\, \eta\, u(K - 2) + \tag{49}$$
$$e^{AT} \int_0^T e^{A\eta} /Bd\, \eta\, u(K - 1) + \int_0^T e^{A\eta} /Bd\, \eta\, u(K)$$

(d) In case of $3T </L \leq 4T$ $$I = e^{A(3T)} \int_0^{/L - 3T} e^{A\eta} /Bd\, \eta\, u(K - 3) + \tag{50}$$
$$e^{A(2T)} \int_0^T e^{A\eta} /Bd\, \eta\, u(K - 2) +$$
$$e^{AT} \int_0^T e^{A\eta} /Bd\, \eta\, u(K - 1) +$$
$$\int_0^T e^{A\eta} /Bn\, \eta\, u(K)$$

(e) In case of $4T </L \leq 5T$ $$I = e^{A(4T)} \int_0^{/L - 4T} e^{A\eta} /Bd\, \eta\, u(K - 4) + \tag{51}$$
$$e^{A(3T)} \int_0^T e^{A\eta} /Bd\, \eta\, u(K - 3) +$$
$$e^{A(2T)} \int_0^T e^{A\eta} /Bd\, \eta\, u(K - 2) +$$
$$e^{AT} \int_0^T e^{A\eta} /Bd\, \eta\, u(K - 1) +$$
$$\int_0^T e^{A\eta} /Bd\, \eta\, u(K)$$

In the operation the equations (47)–(51), it is necessary to previously calculate the following matrices.

$$/Ad = e^{A\sigma}, \quad /Bd = \int_0^\sigma e^{A\eta} /Bd\, \eta \tag{52}$$

As described above, since the matrix /A of the matrices in the equation (52) is changed depending on the operation conditions, it is necessary to obtain the matrix of the equation (52) coincident with the operation conditions from the following matrices calculated with respect to an augmented matrix in the reference operation conditions.

$$/Ad_0 = e^{A0\sigma}, \quad /Bd_0 = \int_0^\sigma e^{A0\eta} /B_0 d\, \eta \tag{53}$$

From the augmented matrices of the equation (10), $/Ad_0$, $/Bd_0$, $/Ad$ and $/Bd$ are expressed by the following equations.

$$/Ad_0 = \begin{bmatrix} 1.0 & ad_{10} \\ 0 & Ad_{220} \end{bmatrix}, \quad /Bd_0 = \begin{bmatrix} b & d_{10} \\ B & d_{20} \end{bmatrix} \tag{54}$$

$$/Ad = \begin{bmatrix} 1.0 & ad_1 \\ 0 & Ad_{22} \end{bmatrix}, \quad /Bd = \begin{bmatrix} b & d_1 \\ B & d_2 \end{bmatrix} \tag{55}$$

where in partial matrices $ad_{10}$, $ad_1$: $/Ad_0$, $/Ad$, low vector

0 : zero matrix
partial matrix $/Ad_{220}$, $/Ad_{22}$: $/Ad_0$, $/Ad$
partial matrix $/bd_{10}$, $bd_1$: $/Bd_0$, $/Bd$
    row vector
partial matrix $Bd_{20}$, $Bd_2$: $/Bd_0$, $/Bd$ The matrices /Ad, /Bd in the above operation conditions is determined from the matrices $/Ad_0$, $/Bd_0$ in the reference operational conditions by the following equation.

$$ad1 = kado \quad Ad22 = Ad220 \tag{56}$$
$$bd1 = kbd10 \quad Bd2 = Bd20 \tag{57}$$

From the equations (56) and (57), the matrices /Ad, /Bd coincident with some operation conditions can be obtained from the matrices/AD0, /do calculated previously in the matrix of the reference operation condition. A procedure for performing operation of the equations (47) to (51) in accordance with the operation conditions is now described.

(i) From the matrices calculated previously in the matrix in the reference operation conditions $$e^{A0T}, e^{A0(2T)}, e^{A0(3T)}, e^{A0(4T)},$$

the following matrices coincident with the operation conditions are obtained $$e^{AT}, e^{A(2T)}, e^{A(3T)}, e^{A(4T)}$$

(ii) From the matrices calculated previously in the matrix in the reference operation conditions by time T at intervals of $\Delta t$ seconds $$e^{A0(N\Delta t)}, \int_0^{N\Delta T} e^{A0\eta} /B_0 d\, \eta \quad (N = 1, 2, \ldots, T/\Delta t)$$

the following matrices coincident with the operation conditions are calculated $$e^{A(N\Delta t)}, \int_0^{N\Delta t} e^{A\eta} /Bd\, \eta$$

where $\Delta t$ is as short as 1 or 2 seconds usually.

(iii) The average lag time /L is determined from the operation conditions.

(iv) In order to easily understand, description is made to the case of $3T </L \leq 4T$ in (d).

The following $$e^{A(3T)}, e^{A(2T)}, e^{A(T)} \text{ and } \int_0^T e^{A\eta} /Bd\, \eta$$

are determined from the matrices obtained from (i) and (ii)

$0 < /L - 3T \leq T$

Accordingly, $$\int_0^{/L - 3T} e^{/A\eta} /B d\eta$$

is approximated from the matrix calculated at intervals of $\Delta t$ in (ii).

(v) The coefficient matrix necessary for the calculation equation (I) is determined by performing the product operation of the matrix obtained in (iv).

As described above, operation for modifying the matrix necessary for the integration calculation of the second term of the right side of the equation (12) or the calculation equation in the state prediction device 105 is made by the state prediction device adapter 201 shown in FIG. 1.

STATE SHIFTER ADAPTER (3) Means for the control operation equation in the state shifter 105

In the state shifter 105, it is necessary to obtain the matrix $e^{/A/L}$ coincident with the operation conditions. $e^{/A/L}$ is obtained as follows. For example, it is assumed that magnitude of /L is $3T < /L \leq 4T$. At this time, $e^{/A/L}$ is expressed by the following equation.

$$e^{/A/L} = e^{/A(3T)} \cdot e^{/A(/L-3T)}$$

$e^{/A(3T)}$ is already determined in the procedure (i) of (2) for the state prediction device 106.

$e^{/A(N\Delta t)}$ is selected and approximated from the matrix $e^{/A(N\Delta t)}$ calculated in the procedure (ii) of (2) for the state prediction device 106.

Operation for modifying the matrix $e^{/A/L}$ necessary for calculation in the state shifter 105 described above in accordance with the operation conditions are performed by the state shifter adapter 202 shown in FIG. 1.

OPERATION AMOUNT COMMANDER ADAPTER (4) Means for the control operation equation in the operation amount commander 108

In the operation amount commander 108, the operation of the equation (11) is made, while even if the operation conditions are varied, the rapidity of the control is required to be changed.

When the gain matrix of the regulator obtained in the reference operation conditions is /FO and the gain matrix /F obtained by multiplying only the first column of the gain matrix /FO by 1/k when the thickness sensitivity in some operation conditions becomes k times is used, the peculiar value of the matrix (/A-/B/F) at this time is almost the same as in the reference operation conditions. This is dependent on the fact that the matrices A and B are not changed for the operation conditions as described in the equation (42) and only the first term of the vector of the right side of the equation (11) becomes k times.

Operation for modifying the gain matrix /F of the regulator described above is made by the operation amount commander adapter 203 shown in FIG. 1.

SIMULATIONS

Figure 13:
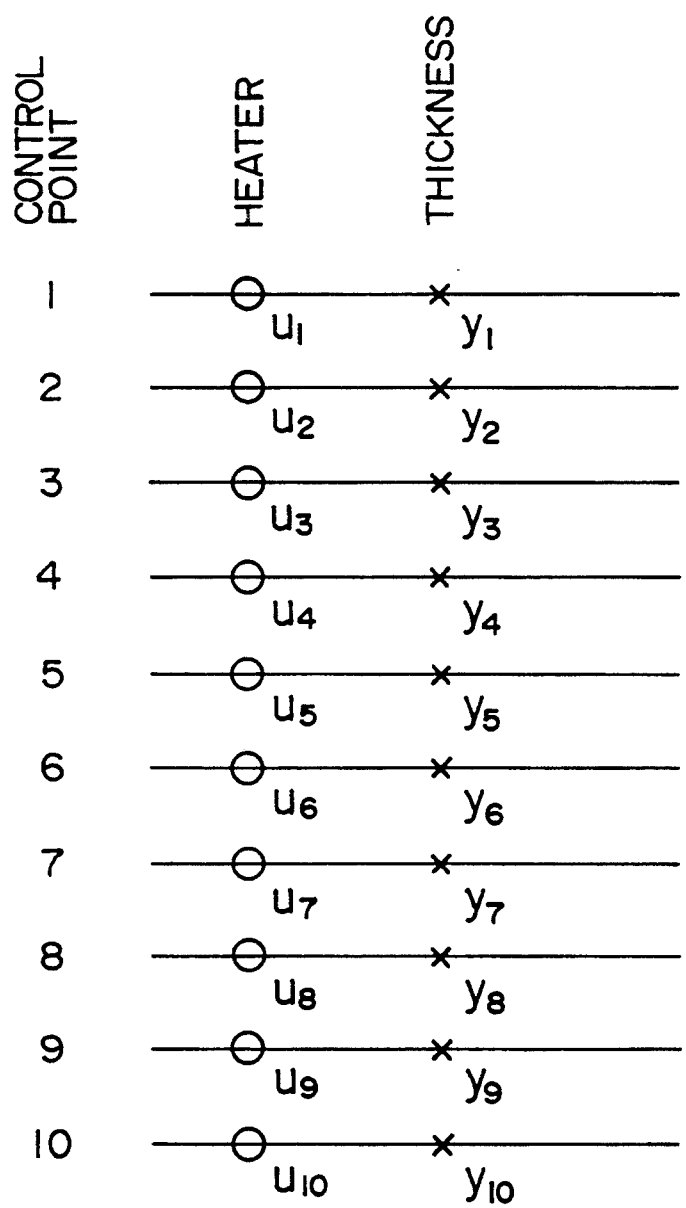
FIG. 13 schematically illustrates ten heaters corresponding to ten thickness detection positions.

In order to demonstrate the effects according to the present invention, simulation result is now described. A control model having ten heater as shown in FIG. 13 is disposed in the middle of a product and a simulation for controlling film thickness at control points 3 to 8 to a predetermined value has been made. In the simulation, when the casting speed is changed in the following two cases as variation example of the operation conditions, control performance is compared.

(1) case 1: casting speed . . . 40 m/min.
(2) case 2: casting speed . . . 25 m/min.

FIG. 14 shows control performance at the control points 3 to 5 when the set value of film thickness is increased by 0.5 μm in accordance with the control points 3 to 8 at the casting speed 40 m/min.

In FIG. 14, thickness variations at the positions corresponding to the heaters 1 and 2 are shown. The control performance for the control points 6 to 8 represent the same result as FIG. 14.

FIG. 14(a) shows time response of film thickness variation.

FIG. 14(b) shows time response of generated heat amount command of the heater.

FIG. 15 shows control performance when the set value of film thickness corresponding to the control points 3 to 5 at the casting speed 25 m/min. is increased by 0.5 μm.

FIG. 15(a) shows time response of film thickness variation.

FIG. 15(b) shows time response of film thickness variation.

Since the sensitivity of film thickness variation amount with respect to the variation amount of heat generated by the heater is increased as the casting speed is reduced, the variation amount of heat generated by the heater is reduced.

The lag time for the film thickness detection is increased as the casting speed is reduced, while it is understood that the control performance is not almost changed and the settled state is reached in about 15 minutes even if the casting speed is varied.

As described above in detail, according to the present invention, the matrix of the control operation equation is automatically modified to a value coincident with the operation conditions in accordance with variation of the lag time due to movement of the film by change of the operation conditions, and the gain matrix of the operational calculator, the gain matrix of the regulator and the matrix in the control operation equation are automatically modified to values coincident with the operation conditions with respect to variation of film thickness sensitivity to variation of heater input by change of the operation conditions, so that the rapidity of the predetermined thickness control can be always obtained even if the operation conditions are varied.

I claim:

1. A film thickness controller comprising:
    a die having a mechanism for adjusting and operating a discharge amount of molten resin along a width direction of a film,
    a thickness gauge for detecting thickness of the film at a measurement position, the thickness gauge being movable along the width direction of the film, molten resin discharged from the die having a lag time L1 before reaching the measurement position,
    a subtracter for producing a thickness difference between a detected value of film thickness measured by said thickness gauge at the measurement position and a set value of thickness, an integrator for time-integrating the thickness difference produced by said subtracter, a memory for storing a time sequence of a past operation amounts during a time L, time L being governed by the equation $$L = L1 + L2$$

where L2 represents time required for said thickness gauge to reach an end of the film from the measurement position, an operational calculator using the time sequence of said past operation amounts stored in said memory for producing an estimated value of state variable before a time when said thickness gauge reaches the end of the film by said lag time L, an operation calculator adapted for modifying a matrix used in an operation equation in said operational calculator to be coincident with operation conditions, a state shifter supplied with an output of said integrator and an output of said operational calculator for producing state estimated value at a time that state is shifted by an average lag time /L which is an average value of said lag time L at both ends of the film, a state shifter adapter for modifying a matrix used in an operation equation in said state shifter to be coincident with the operation conditions, a state prediction device for producing a state variation amount due to input from time greater than said average lag time /L to a time when said thickness gauge reaches an end of the film on the basis of time sequence of the past operation amounts stored in said memory, a state prediction device adapter for modifying a matrix used in an operation equation in said state prediction device to be coincident with the operation conditions, an adder for adding an output of said state shifter and an output of said state prediction device and producing a state estimated value at a time when said thickness gauge reaches the end of the film, an operation amount commander for multiplying the state estimated value produced by said adder by state feedback gain for producing a command value of the operation amount of the operation end, and an operation amount commander adapter for modifying a matrix used in an operation equation in said operation amount commander to be coincident with the operation conditions.

2. The film thickness controller of claim 1 wherein the mechanism for adjusting and controlling the amount of molten resin includes at least two heating elements, thickness measurements of the film being taken at positions along the width of the film corresponding to positions of the heating elements.

* * * * *